United States Patent [19]

Smith

[11] 3,987,403

[45] Oct. 19, 1976

[54] SENSORY AIDS FOR THE BLIND

[76] Inventor: Russell Peter Smith, 21 Muritai Terrace, Christchurch, New Zealand

[22] Filed: Jan. 15, 1975

[21] Appl. No.: 541,146

[30] Foreign Application Priority Data

Jan. 18, 1974 New Zealand ....................... 173130

[52] U.S. Cl. ............................. 340/1 R; 340/3 FM; 343/5 SM

[51] Int. Cl.[2] ......................... G01S 9/68; G01S 7/54

[58] Field of Search ......................... 340/1 R, 3 FM; 343/5 SM, 7 AG; 325/306, 307, 348, 397, 398, 401, 407

[56] References Cited

UNITED STATES PATENTS

| | | | |
|---|---|---|---|
| 2,754,492 | 7/1956 | Parker | 340/3 FM |
| 2,959,674 | 11/1960 | O'Meara | 325/401 |
| 2,984,741 | 5/1961 | Bronstein et al. | 325/307 |
| 3,366,922 | 1/1968 | Kay | 340/1 R |
| 3,742,433 | 6/1973 | Kay et al. | 340/1 R |

*Primary Examiner*—Richard A. Farley
*Attorney, Agent, or Firm*—Holman & Stern

[57] ABSTRACT

A sensory aid for the blind in which a frequency swept ultra-sonic carrier signal is generated and radiated as acoustic energy from a head set and reflected acoustic energy is received by two spaced apart receiving transducers which feed a two channel receiver. The receiving transducers have divergent polar lobes which in combination with the polar lobe of the transmitting transducer simulate the characteristics of a normal human auditory system. The carrier signal is multiplied with each received signal to produce respective beat frequency signals each of which have a frequency and level which is dependant on the range and direction respectively of the source of reflection with respect to the user. The gain of both channels is controlled synchronously by controlling the level of the carrier signal multiplied with each received signal. The range of gain control can be increased by feeding the transmitting transducer with the controlled level carrier signal.

8 Claims, 5 Drawing Figures

SENSORY AIDS FOR THE BLIND

BACKGROUND OF THE INVENTION

This invention relates to sensory aids for the blind and in particular to aids of the binaural type assuming the form of spectacles.

Binaural sensory aids for the blind have been described in U.S. Pat. Nos. 3,172,075 and 3,366,922. In the first patent a single transmitter transducer is mounted in the vicinity of the bridge of a spectacle-like frame, and two receiving transducers are mounted one on each side of the transmitting transducer. The electronics are accommodated in a remote unit carried in the user's pocket, for example, although the above specifications refer to the possibility of including receiver pre-amplifiers in the spectacle frames. In this system the transmitted signal as reflected by objects in its path is received by two spaced apart receiver transducers to provide directional and range information on the source of the transmitted signal reflection. The transmitted signal is frequency swept and accordingly the received echos will show a difference in frequency with respect to the transmitted signal at any one instant due to the time delay of the signal paths. The received signals are therefore each multiplied with the transmitted carrier to produce audible beat frequency signals. The respective frequencies of which are proportional to the distance between the particular receiver transducer concerned and the source of reflection. The beat frequencies will be the same when the source of reflection is directly in front of the user. In U.S. Pat. No. 3,366,922 resolution of direction is improved by providing the receiving transducers with divergent polar lobes so that directional information is supplied by the differing relative levels of the two received signals thus as with a human auditory system. Since the gain of the two receiver channels is made variable to allow the user to select the volume of the signals perceived it is essential to be able to control the gains of each receiver channel in precise synchronism. It is desirable in such spectacle type aids to be able to fold the side frames down as in the manner of ordinary spectacles, and to be able to use a light flexible cable between the remote unit and the spectacle frame which may be detachable from the frame. In the known aids these requirements are not easily met owing to the large number of conductors in the cable between the remote unit and the spectacle frame and also running around the frame temples and the frame proper.

An obvious step towards meeting the above mentioned desiderata which is now technologically possible, is to mount the complete receiver circuits inside the spectacle frame. However, it is still necessary to control the gain of the aid from the remote unit and to achieve precise gain tracking of both left and right channels. Thus, a relatively large number of conductors would still be required between the remote unit and the spectacle frame.

SUMMARY OF THE INVENTION

It is an object of the present invention to go some way towards overcoming the above mentioned disadvantages.

Accordingly the invention consists in a sensory aid for the blind as follows. As ultrasonic carrier signal oscillator which is periodically frequency swept produces a signal which drives a transmitting transducer which in turn radiates acoustic energy to a field of view. A two channel receiver system receives the acoustic energy reflected from objects within the field of view. Each channel includes a receiving transducer which is mounted on the head set with the transmitting transducer.

The receiving transducers have divergent polar lobes which in combination with the polar lobe of the transmitting transducer simulate the characteristics of a normal human auditory system. A multiplier receives as one input the signal from the transducer. A variable attenuator also fed from the carrier signal oscillator supplies the multiplier with a selected level of carrier signal as a second input. The output of the multiplier drives sound reproducing means which provide one respective ear of the user with a beat frequency signal the frequency and level of which is representative of the position of the object with respect to the user. The gain of both channels is controlled by the setting of the variable attenuator.

BRIEF DESCRIPTION OF THE DRAWINGS

The preferred forms of the invention will now be described with reference to the accompanying drawings, in which.

The two channel gain control which substantially contributes to the improved binaural sensory aid of the present invention will first be described in general terms.

DETAILED DESCRIPTION OF THE PREFERRED EMBODIMENTS

The two channel gain control which substantially contributes to the improved binaural sensory aid of the present invention will first be described in general terms.

Figure 1:
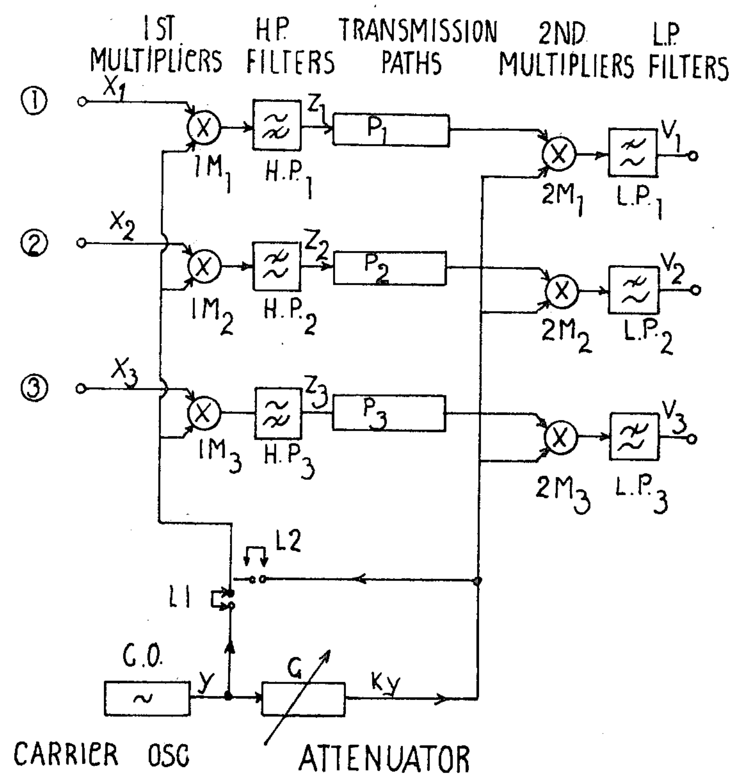
FIG. 1 is a block circuit diagram of a multi-channel gain control, including the alteration necessary to achieve greater attenuation.

Referring to FIG. 1, three channels of a multi-channel system are shown where the respective input intelligence signals are $x_1$, $x_2$, and $x_3$, and the corresponding output signals are $v_1$, $v_2$, and $v_3$. Each channel input signal feeds one of a first set or bank of multipliers 1M, 1M$_2$, and 1M$_3$. A carrier oscillator *c.o.* generates a carrier signal $y$ which feeds each of the first multipliers. The output of each multiplier, which may be considered to be the carrier signal $y$ modulated by each intelligence signal $x_i$ (where i is the channel number) is fed to a high pass filter H.P.$_i$ to remove any residual input signal due to imperfect multiplication. The outputs $z_i$ of the high pass filters feed transmission paths $P_i$ which could vary in nature from a simple connecting lead to an electromagnetic or acoustic transmission medium. The received signal from each transmission path is fed to one of a second bank of multipliers 2M$_i$. The carrier signal $y$, as well as feeding the first multipliers, is taken to a variable attenuator G, and the attenuated output signal k.$y$ feeds each of the second multipliers. The product of the attenuated carrier signal $k.y$ with each received signal is fed to a low pass filter L.P.$_i$, which removes signal components having frequencies greater than the frequencies of the input signals $x_i$. The resultant output signals $v_i$ are replicas of the input signals $x_i$, diminished by the attenuation factor K. Hence, a variation of the variable attenuator G effects all channels equally.

That the above result is obtained is demonstrated by the following analysis.

Assuming both signal and carrier waveforms are sinusoidal the signal and carrier may be represented respectively as:

$$x_i = X_i \sin w_i t$$

and $$y = Y \cos w_y t$$

where $w_i$ = the angular frequency of the input signal
$Wy$ = the angular frequency of the carrier signal
$X_i$ = the amplitude of the input signal
$Y$ = the amplitude of the carrier signal The output of the first multiplier 1M$_i$ will be:

$$X_i Y \sin w_i t + S$$

or $$\frac{X_i}{2}[\sin(w_i+w_y)t + \sin(w_i-w_y)t] + S$$

where S represents signals produced by imperfect operation of the multipliers.

Imperfect operation of the multipliers will allow some of the original signals $x_i$ and some of the carrier signal $y$ to appear at the output of each multiplier. High pass filtering will completely eliminate the residual $x_i$ feedthrough if the carrier frequency is chosen appropriately but will allow a residual carrier signal Cy to pass.

The high pass filter output $Z_i$ is then:

$$\frac{X_i Y}{2}[\sin(w_i+2w_y)t + \sin(w_i-w_y)] + Cy$$

Any modification by the transmission path can be ignored since this is irrelevant to the operation of the system The second multiplier output, $z_i$Ky is:

$$\frac{X_i K Y^2}{2}[\sin(w_i+2w_y)t + \sin w_i t + \sin w_i t \sin(w_i-2w_y)t] + CKY^2(\cos 2w_y t+1) + S'$$

Again, due to multiplier limitations, some of $z_i$ and $y$ will also appear at the output. These unwanted outputs are accounted for in the term S'. However, providing the carrier signal has been chosen to be greater than twice the frequency of $x_i$ the only terms which appear at the output of the LP filters are:

$$V_i = \frac{X_i K Y^2}{2} \sin w_i t + \frac{CKY^2}{2}$$

The second term is a small spurious DC term which may be minimised by optimum adjustment of the first multiplier and in many applications is irrelevant. The useful output term is:

$$v_i = \frac{1}{2} X_i K Y^2 \sin w_i t = \frac{K}{2} Y^2 x_i$$

$$v_1 = \frac{K}{2} Y^2 x_1$$

$$v_2 = \frac{K}{2} Y^2 x_2$$

$$v_3 = \frac{K}{2} Y^2 x_3$$

That is, the amplitudes of signal outputs of all channels vary directly with K.

With the above method of gain control tracking between channels to within 0.1 dB over a dynamic range of 60 dB can be achieved without difficulty.

Figure 3:
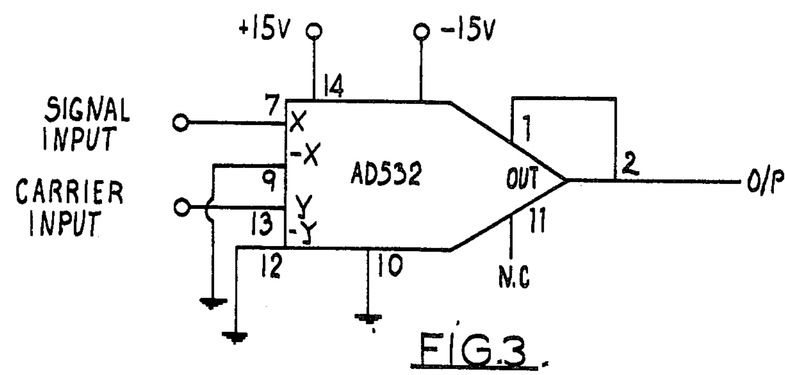
FIG. 3 is an example of a multiplier suitable for use in a multi-channel gain control.

Various known multipliers, filters, oscillators and variable attenuators may be used in a realization of the block circuit shown in FIG. 1. However, as an example, a typical multiplier circuit is shown in FIG. 3. The AD 532 multiplier used is an integrated circuit of the 14 pin packaged type produced by Analogue Devices Incorporated. The variable attenuator may be a precision step switch type, or a simple variable resistance type, depending on the application. Similarly, the characteristics of the high and low pass filters will vary according to the application.

A considerably greater range of attenuation is provided by applying the attenuated carrier signal to each multiplier of the first bank of multipliers. This is illustrated in FIG. 1 where link $L_1$ would be removed and link $L_2$ inserted. In this case, the carrier signal feeding the first multipliers also reduces as K reduces. The output signals of this form of the invention may be represented as:

$$V_i = \frac{K^2}{2} Y^2 x_i$$

Thus, the outputs now all vary directly with $K^2$. In this second form of the invention the dynamic range over which the gain may be varied is greatly increased due to the effective provision of two separate stages of attenuation, each having the same range as the single stage of the first form of the invention. As previously mentioned, the range of attenuation is limited by the stray coupling between the input and the output of the attenuator or direct coupling of the signal source into the output circuit. The two stage attenuation approach described as well as providing a theoretically greater range of attenuation, reduces coupling between the input and output by use of two isolated stages of attenuation. In terms of decibels the second form of the invention provides twice the attenuation of the first form.

Figure 2:
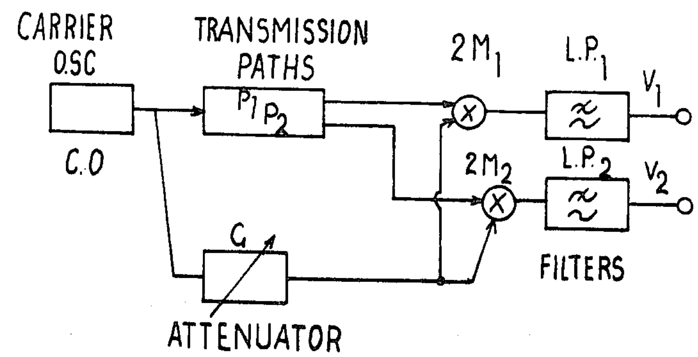
FIG. 2 is a block circuit diagram of a two-channel gain control suitable for use in a binaural sensory aid for the blind.

The application of the gain control described to a blind aid of the type disclosed in U.S. Pat. Nos. 3,172,075 and 3,366,922 will now be described. Since the blind aid uses two acoustic electric receiving transducers mounted with a single electric acoustic transmitting transducer the system is a two channel one, each transmission path comprising the air path from the transmitting device to a reflecting object and the return air path to a respective receiving device. The useful information derived from each receiving device is the time taken for the acoustic signal to traverse each transmission path and the angle each path makes with the receiving transducers. Because the "intelligence" information in this system is inherently produced by the transmission paths the carrier signal feeds both transmission paths without prior multiplication with external intelligence signals. As will be appreciated from FIGS. 1 and 2 and associated description of U.S. Pat. No. 3,172,075 which describes the electronics used in the sensory aid of U.S. Pat. No. 3,366,922 the transmission path reflection time information is made available by frequency sweeping the transmitted carrier signal and multiplying this frequency swept signal with the received and delayed reflections of the transmitted signal. Accordingly the gain control described with reference to FIG. 1 of the present specification takes the configuration shown in FIG. 2 when used to control the amplitudes of the output signals of the two channel blind aid system. This can be compared with FIG. 1 of U.S. Pat. No. 3,172,075 and it will be seen that the modification permitting synchronous gain control of both receiving units is the provision of attenuator G in the carrier signal feeds the multipliers (labelled frequency changers 19 in the U.S. Patent). The level of the audible signal from both multipliers thus varies in accordance with the attenuator factor K of attenuator G.

Conventional gain control as applied to the circuit in FIG. 1 of U.S. Pat. No. 3,172,075 would require two leads from each audio amplifier 23 to a two-gang attenuator.

The present gain control system may be operatively connected to the receiver circuits of the blind aid by only one conductor, assuming a signal earth conductor to be already present. When such a gain control is used the number of conductors between the remote unit (incorporating power supply, signal generator, and gain control) and the spectacle frame, is considerably reduced as also are the number of conductors linking the eye frames with the side frame. Further, the receiver pre-amplifier, multiplier, low pass filter and amplifier circuits can all be included within the spectacle frames to reduce the number of linking conductors. Apart from possibly the pre-amplifiers, these circuits have previously been included in the remote unit and connected by cable to the spectacle frames.

Figure 4:
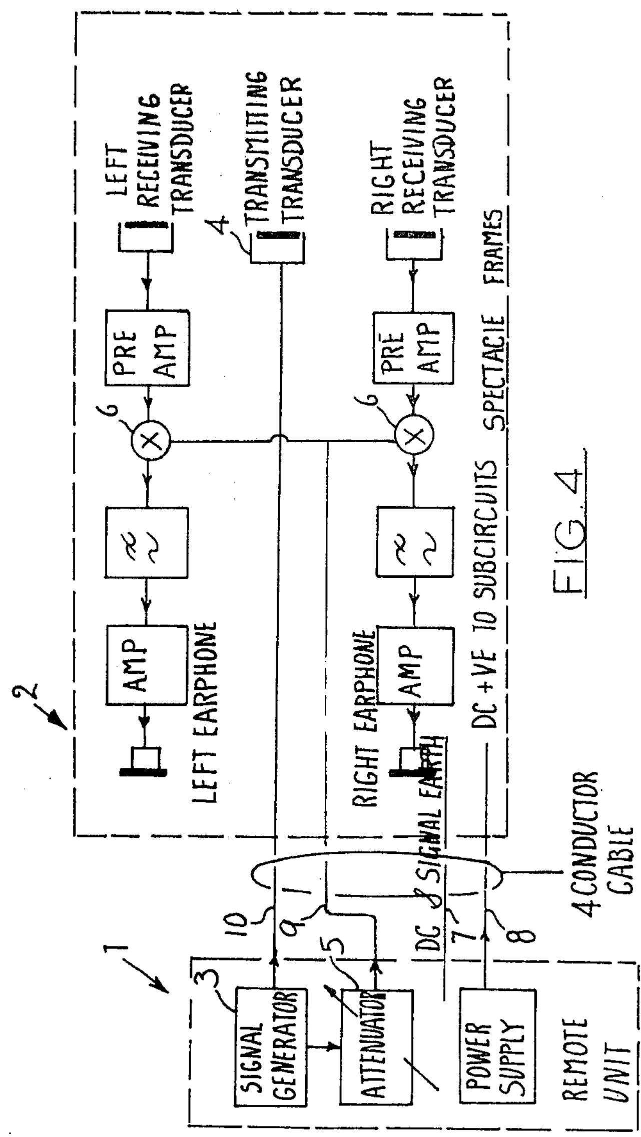
FIG. 4 is a block diagram of one form of binaural sensory aid.

The resulting simplification can be readily appreciated from FIG. 4. The remote unit 1 contains a signal generator 3, which generates a signal at transmission frequency to be fed to both the transmitter transducer 4 and to an attenuator 5 within the unit which provides a variable amplitude carrier for feeding the receiver multipliers 6. Hence, only four conductors are required in the cable link between the remote unit 1 and the spectacle frames 2. These conductors are: the signal and d.c. earth 7, and d.c. positive line 8 feeding the receiver circuitry, the attenuated carrier signal line 9 and, the transmission signal line 10.

It will be readily appreciated that a cable containing only four conductors can be made particularly flexible and light and thus not impose any undue inconvenience on the user, which might otherwise result from a stiff and/or heavy cable connection between the remote unit on some part of his person to the spectacle frames.

Figure 5:
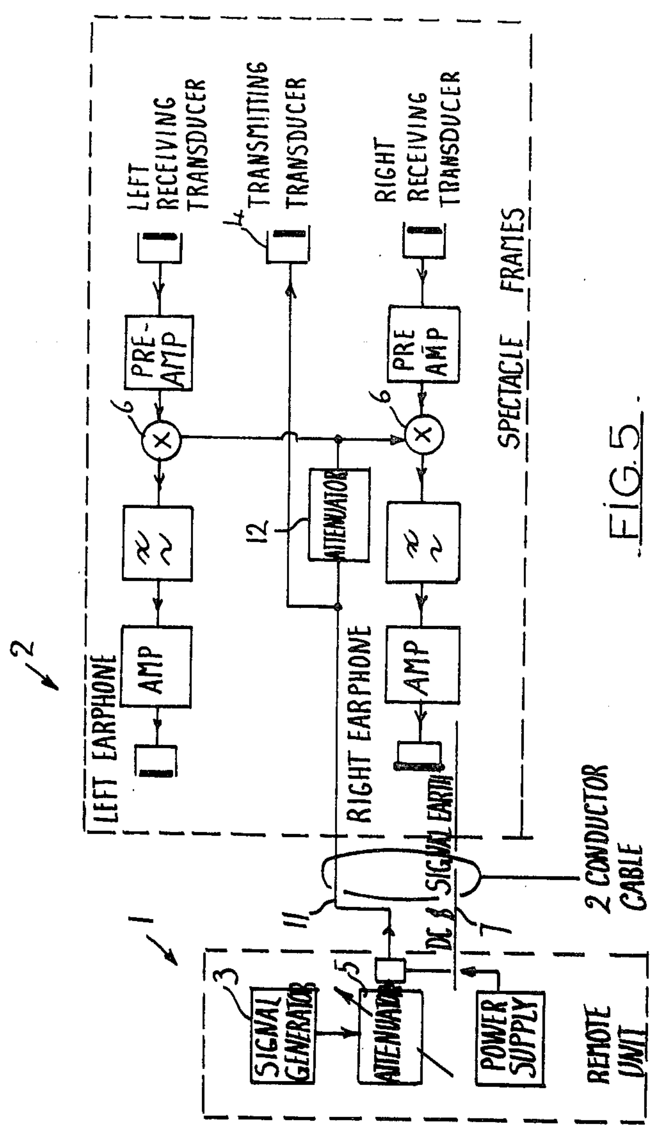
FIG. 5 is a block diagram of a second form of binaural sensory aid.

The form of the gain control described whereby the range of attenuation may be doubled can also be used to result in a further simplification to the blind aid packaging. Such a simplified set-up is shown in FIG. 5. In this form of the invention the signal to be transmitted is taken from the output of attenuator 5. That is, the variable amplitude carrier for multiplying with the received signals is also used to drive the transmitting transducer 4. Hence, it is only necessary to have a single conductor 11 to carry the signal voltage to the spectacle frames. If the level of the transmitted signal is in excess of the receiver multiplier requirements further attenuation can be provided by a fixed attenuator 12 at the spectacle frame as shown. A further conductor in the linking cable can be dispensed with by feeding the required positive d.c. voltage via the carrier signal conductor 11. Hence, in this form of the present invention only two conductors are required in the linking cable between the remote unit and the spectacle frames. This in turn reduces the number of conductors which must pass around the side arm hinge from the cable terminating point at the extremity of one of the side frames to the bridge frame on which the transducers are mounted and thence to the second side arm. Thus the provision of flexible connections around the hinges is simplified and can be made using flexible printed circuits.

For convenience the linking cable can be made detachable from the spectacle frame by the use of a simple plug and socket. This, together with the provision of an extremely light flexible linking cable, and with the ability to fold the side frames of the spectacles down, due to the reduced number of conductors around the spectacle frame, leads to a greatly improved binaural sensory aid for blind persons.

I claim:

1. A sensory aid for the blind comprising: an ultrasonic carrier signal oscillator which is periodically frequency swept, a head-set mounted transmitting transducer driven by a signal derived from the oscillator signal which radiates acoustic energy to a field of view, a two channel receiver system receiving the acoustic energy reflected from objects within said field of view, each channel including (a) a head-set mounted receiving transducer mounted with the transmitting transducer, the receiving transducers having divergent polar lobes which in combination with the polar lobe of the transmitting transducer simulate the characteristics of a normal human auditory system, (b) a muliplier having as one input the signal from the receiving transducer, (c) sound reproducing means driven by the output of said multiplier to provide one respective ear of the user with an audible signal the level of which is representative of the direction of the object with respect to the user, and common to both channels, a variable attenuator fed from the carrier signal oscillator which supplies said transmitting transducer and multiplier in each of said channels with a selected level of carrier signal as a common second input such that said audible signal has a frequency dependent on the distance between the respective receiving transducer and the object, the gain of both channels being controlled by the setting of said variable attenuator.

2. A sensory aid according to claim 1 wherein the receiver multipliers and sound reproducing means are mounted in said head-set, whereas the carrier signal oscillator, the variable attenuator and the power supply for the sensory aid are mounted in a remote unit located elsewhere on the users body.

3. A sensory aid according to claim 2 wherein only four conductors link the head-set with said remote unit and these are a d.c. and signal earth, a d.c. supply rail, a connection between the carrier signal oscillator and the transmitting transducer, and a connection between the variable attenuator and the multipliers.

4. A sensory aid according to claim 3 wherein said head set is a spectacle frame.

5. A sensory aid according to claim 1 wherein a fixed attenuator is interposed between said variable attenuator and said multipliers.

6. A sensory aid according to claim 1 wherein the receiver multipliers and sound reproducing means are mounted in said head-set, whereas the carrier signal oscillator, the variable attenuator and the power supply for the sensory aid are mounted in a remote unit located elsewhere on the users body.

7. A sensory aid according to claim 6 wherein only two conductors link the head set with said remote unit and these are a d.c. and signal earth, and a connection from the variable attenuator to the transmitting transducer and multipliers which also acts as the d.c. supply rail.

8. A sensory aid according to claim 7 wherein said head set is a spectacle frame.

* * * * *